(12) United States Patent
Lee et al.

(10) Patent No.: US 9,677,238 B1
(45) Date of Patent: Jun. 13, 2017

(54) PNEUMATIC FLOATING FENDER WITH A PLASTIC PROTECTION COVER

(71) Applicant: William Wei Lee, Shanghai (CN)

(72) Inventors: William Wei Lee, Arcadia, CA (US); Duan Qingling, Jinan (CN); Yu Guangfeng, Jinan (CN); Zhao Dianhua, Jinan (CN)

(73) Assignee: William Wei Lee, Arcadia, CA (US)

( * ) Notice: Subject to any disclaimer, the term of this patent is extended or adjusted under 35 U.S.C. 154(b) by 0 days.

(21) Appl. No.: 15/189,909

(22) Filed: Jun. 22, 2016

(51) Int. Cl.
  *B63B 59/02* (2006.01)
  *E02B 3/26* (2006.01)

(52) U.S. Cl.
  CPC ...................... *E02B 3/26* (2013.01)

(58) Field of Classification Search
  CPC .................. E02B 3/26; B63B 59/02
  See application file for complete search history.

(56) References Cited

U.S. PATENT DOCUMENTS

| | | | | |
|---|---|---|---|---|
| 2,346,391 A | * | 4/1944 | Pitou | B63B 9/00 114/219 |
| 3,693,572 A | * | 9/1972 | Crook | E02B 3/26 114/219 |
| 5,018,471 A | * | 5/1991 | Stevens | E02B 3/26 405/211 |
| 5,460,463 A | * | 10/1995 | Smith | E02D 5/60 405/212 |
| 6,896,447 B1 | * | 5/2005 | Taquino | F15D 1/10 114/243 |
| 2003/0005873 A1 | * | 1/2003 | Vretta | E02B 3/26 114/219 |
| 2010/0287715 A1 | * | 11/2010 | Voyiadjis | F16F 7/12 14/76 |
| 2015/0325099 A1 | * | 11/2015 | Sakakibara | G01L 5/101 340/668 |

\* cited by examiner

*Primary Examiner* — Stephen Avila
(74) *Attorney, Agent, or Firm* — Tim Liu; Liu Law Group, pllc

(57) ABSTRACT

A conventional pneumatic fender has an outer protection cover composed of used tires and steel chains. Due to the high friction coefficient at the tire side surfaces and the ship motion induced high impact forces, the lateral friction forces could be very high. These high friction forces not only increase the wearing damages at the tire side surfaces, but also cause scratching damages to the paints on the ship outer shell. A new type of outer protection cover using plastic plates is utilized to replace used tires and steel chains in order to reduce the wearing damages to the fender and to reduce the scratching damages to ship outer shell paints. Such reduction should be able to help the shipping industry achieve cost savings from decrease of scheduled ship re-paintings in dry docks.

28 Claims, 5 Drawing Sheets

PNEUMATIC FLOATING FENDER WITH A PLASTIC PROTECTION COVER

FIELD OF THE INVENTION

The disclosure relates generally to a new type of pneumatic floating fender using a plurality of plastic plates to form the outer protection cover, thus replacing used tires and steel chains as used in the conventional outer protection cover of a pneumatic floating fender.

BACKGROUND OF THE INVENTION

Conventional Pneumatic Floating Fender

Conventional pneumatic floating fenders are typically used to absorb dynamic impact loading between a jetty and a ship side shell, and, in naval applications, between two ships to avoid direct shell-to-shell impact. Referring to FIG. 1A, a conventional pneumatic floating fender 100 is usually composed of one outer protection cover and two body layers, as follows:

(1) The outer protection cover consists of used tires 101, steel chains 102, a valve 103 and two towing rings 104 with one at each end. The purpose of this cover is to protect the rubber layer beneath against friction induced wearing damages. Impact loading induced friction forces acting at these tire 101 side surfaces should be transferred to the towing rings 104 at both ends of the fender 100 through these steel chains 102. The total weight of these tires and chains are very heavy, thus making transportation and offshore handling of the fender difficult;

(2) The first fender body layer is the outer rubber layer composed of rubber material and several layers of fiber nets such as polyester nets, which are bonded together through a vulcanization process to provide the structural strength of the fender. The same vulcanization process should also bond this layer to the steel surfaces of the two towing rings 104 to form a sealed room inside the fender 100;

(3) The second body fender layer is composed of a thin layer of rubber or synthetic materials for the purpose of air sealing, so that the pneumatic fender 100 can maintain its designed air pressure with a need for very few air pressure adjustments throughout its entire service life.

When a floating fender is placed between two ships side-by-side under offshore conditions, direct high impact forces acting at these tire side surfaces and lateral relative motions between the two ships could occur at the same time to produce a large lateral friction force at these loading surfaces. Such large friction force will provide little help for the reduction of a ship's lateral motion, as its magnitude is way too small compared with the wave induced movement of the ship. The magnitude of the friction force is a direct product of the impact force magnitude at the tire side surfaces and the friction coefficient of these surfaces. Because the friction coefficient of these tire side surfaces usually is significant (friction coefficient >1.0 or more at most tire side surfaces), and so the friction force is large enough to cause serious wearing damages to the tire side surfaces. This motion induced large friction force at tire side surfaces should also produce the same magnitude friction forces acting in the opposite direction at the ship outer shell surfaces to cause scratching damages to the ship shell surface paints. Furthermore, modern tires are usually equipped with steel wire nets bonded with the layers of rubber materials, which should make the scratching induced paint damages much worse. As the tire side surface wearing damage increases, steel chains, which pass through the holes at the middle height of each used tire, could directly contact ship outer surfaces to cause not only greater paint scratching damages, but also a potential structural damage to the ship outer shells as well. To the shipping industry as a whole, the pneumatic floating fender induced paint damages have become one of the major reasons for all ships to have to perform a scheduled re-painting work inside dry docks at required intervals. For navy ships, this protection of the outer shell paints is even more important than commercial ships, because some special paints can absorb radar waves to help make the ships stealthy.

Clearly there is a need in the shipping industry to reduce the paint damage induced costs associated with frequent scheduled re-painting work for each ship.

Foam filled fender is an alternative to standard pneumatic floating fenders for small sized vessels and warships. FIG. 1B is a conventional foam filled offshore fender 110 without an outer protection cover, in prior art. A foam filled fender 110 usually has an outer protection cover similar to the one of a pneumatic floating fender with used tires and steel chains. For the body of a foam filled fender 110, it usually has a rubber or polyurethane outer layer and foam 112 filled inner body. There is a steel chain 111 inside the fender to connect two towing rings 114 together at the two ends of the fender 110. The fender 110 performance properties can be modified by changing the grades of the foam 112. Without air pressure inside the fender 110, there should be no concerns for deflating, burst or sink. In addition, this configuration also eliminates the safety valves and ball valves, etc. with the reduction of associated maintenance costs of the fender 110 compared with a pneumatic floating fender 100. One disadvantage of a foam filled fender 110 is its big size during transportation and resultant high freight costs.

The best way to reduce the fiction force is to replace used tires and steel chains with a low friction coefficient material for the outer protection cover of a pneumatic floating fender. Nevertheless, this substitute material has to possess other required properties as well. The material selected in this disclosure is called Ultra High Molecular Weight Polyethylene (UHMWPE) plate, a widely used plastic material with some superior properties well suitable for the substitute material as the protection cover of a pneumatic floating fender. One typical UHMWPE plate (also called "plastic plate" in this document) has the following key properties:

(1) superior property to stand repeated impact loading and as well as to absorb impact loading energy with low noises;

(2) superior property to stand the friction induced wearing, e.g., an anti-wearing property 7 times better than that of a common carbon steel plate with a similar configuration, based on test data;

(3) a very low friction coefficient with a self-lubricant ability. Under offshore storm environments with wet plate surfaces, the measured friction coefficient is typically between 0.05~0.1, which is about $\frac{1}{10}$~$\frac{1}{20}$ that of a tire side surface. In other words, the motion induced friction force by a UHMWPE plate could be as small as 5% of the one produced by a tire side surface under the same impact loading magnitude and the same lateral motions between two ships;

(4) superior property for not absorbing water when submerged, making it well suitable for offshore applications;

(5) density of 0.94 which is less than that of seawater, so capable of providing some buoyancy when submerged;

(6) One additional advantage of using plastic plates to replace conventional tires and steel chains is the ability to have different colors for the surfaces of these covers. In contrast, tires only have one fixed color of black, which is not an eye-catching color under offshore environments. The most visible color from a long distance away is orange, which is the common color for various safety wears on the sea. If plastic plates are used as the fender outer protection cover, a large selection of colors could be used including orange; and (7) The unique property of the extra smooth surfaces of a UHMWPE plate makes it very difficult for marine growths to hang on to under offshore environmental conditions.

However, a UHMWPE plate has two properties which make it hard to be utilized to replace tires and steel chains as the outer protection cover for a pneumatic floating fender. First, the melting point is about 136° C. which is just below the temperature used for vulcanization of the fender body rubber layer. Second, UHMWPE is very difficult to be mixed or bonded with other materials such as a rubber layer. These two properties make the UHMWPE plate very difficult to be bonded directly with rubber layer through a vulcanization process. Therefore, the primary challenge for utilizing UHMWPE plates for the replacement of tires and chains is how to fix a UHMWPE flat and hard plate firmly to the surface of the fender body outer layer's curved and soft rubber surface. Secondly, the fixation should avoid producing excessive bending moment between the flat and hard plate and the curved and soft rubber surface due to fatigue concerns. At the same time, impact induced friction forces should be able to be transferred to the towing rings at the two ends of a pneumatic floating fender.

OBJECTIVES OF THE INVENTION

One embodiment to overcome the two above mentioned difficulties of using UHMWPE plates to replace tires and steel chains as the outer protection cover for a pneumatic floating fender is to use an indirect method: first step is to embed a steel plate, with bolts welded on it, to the fender outer rubber surface through a vulcanization process; and second step is to fix each UHMWPE plate to the steel plate with the help of bolts and nuts.

Using the disclosed indirect method to fix a flat and hard UHMWPE plate to a fender curved and soft outer surface should satisfy the following requirements:

(1) The fixation should be strong and durable against offshore environmental conditions, especially capable of standing bending induced fatigue damages at such fixation;

(2) The friction forces generated at the surfaces of the UHMWPE plate should be able to be transferred to the towing ring at each end of a pneumatic floating fender;

(3) At a fixation spot, local reinforcement should be applied locally to ensure reliable strength and endurance. In addition, some fixations at certain fixation spots should also be able to provide structural reinforcement to improve the overall structural strength of the fender;

(4) All corners and angles of these UHMWPE plates should be rounded and smooth in order to minimize the potential wearing or/and scratching damages to the fender outer surface beneath or potentially to ship outer shells;

(5) All the materials used for the fixation shall be durable, such as stainless steel, and the UHMWPE plates are individually replaceable if any single one is damaged during application; and (6) The indirect method to fix a flat and hard UHMWPE plate at a fender curved and soft outer surface should be able to be applied to a foam filled offshore fender with rubber outer layer as is used for a pneumatic floating fender.

BRIEF DESCRIPTION OF THE DRAWINGS

The drawings described herein are for illustrating purposes only of selected embodiments and not all possible implementations, and are not intended to limit the scope of the present disclosure. For further understanding of the nature and objects of this disclosure reference should be made to the following description, taken in conjunction with the accompanying drawings in which like parts are given like reference materials, and wherein:

FIG. 2-1 is a cut-off cross section view along A-A' line in FIG. 2 showing the details of how a UHMWPE plate is fixed to an embedded steel plate with bolts and nuts;

FIG. 2-2 is a cut-off cross section view along B-B' line in FIG. 2 showing the details of how a UHMWPE plate is fixed to another UHMWPE plate as a shim plate placed between the UHMWPE plate and the fender outer surface layer;

DETAILED DESCRIPTION OF THE EMBODIMENTS

Before explaining the disclosure in detail, it is to be understood that the system and method is not limited to the particular embodiments and that it can be practiced or carried out in various ways.

Figure 1A:
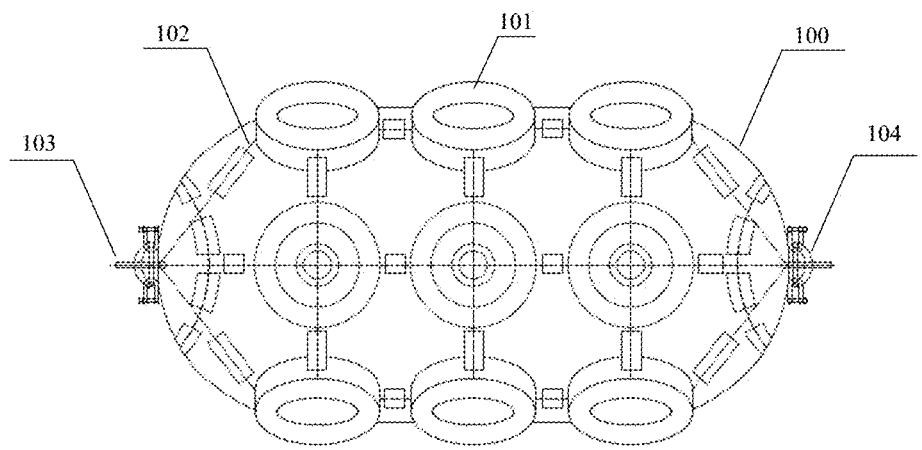
FIG. 1A is a side view of a conventional pneumatic floating fender in prior art.

Referring to FIG. 1A, a conventional pneumatic floating fender 100 with the outer protection cover consisting of used tires 101, steel chains 102, a valve 103 and two towing rings 104 with one at each end. The purpose of this cover is to protect the rubber layer beneath against friction induced wearing damages. Impact loading by induced friction forces acting at these tire 101 side surfaces should be transferred to the towing rings 104 at both ends of the fender 100 through these chains 102.

Figure 1B:
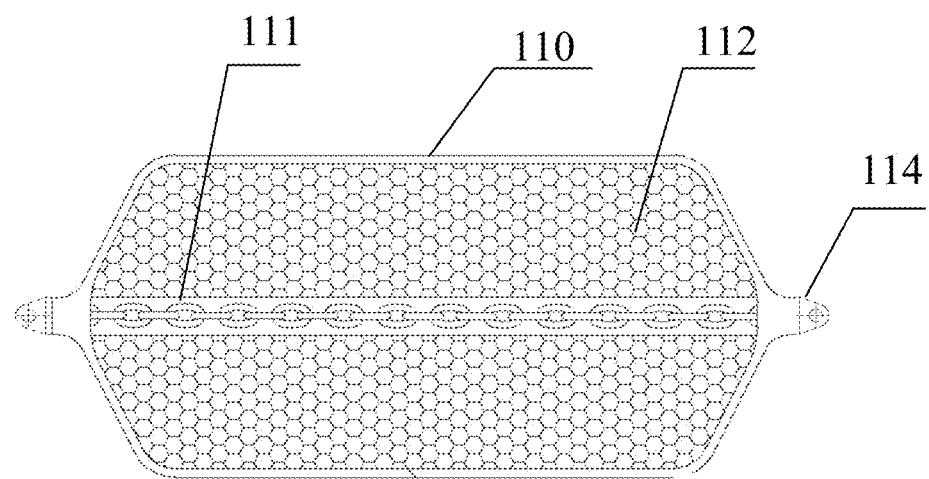
FIG. 1B is a side view of a conventional foam filled offshore fender in prior art.

FIG. 1B illustrates a conventional foam filled offshore fender 110 without the outer protection cover. The body of the foam filled fender 110 has a rubber outer layer and foam 112 filled inner body. There is a steel chain 111 inside to connect the two towing rings 114 together with one at each end of the fender 110.

Figure 2:
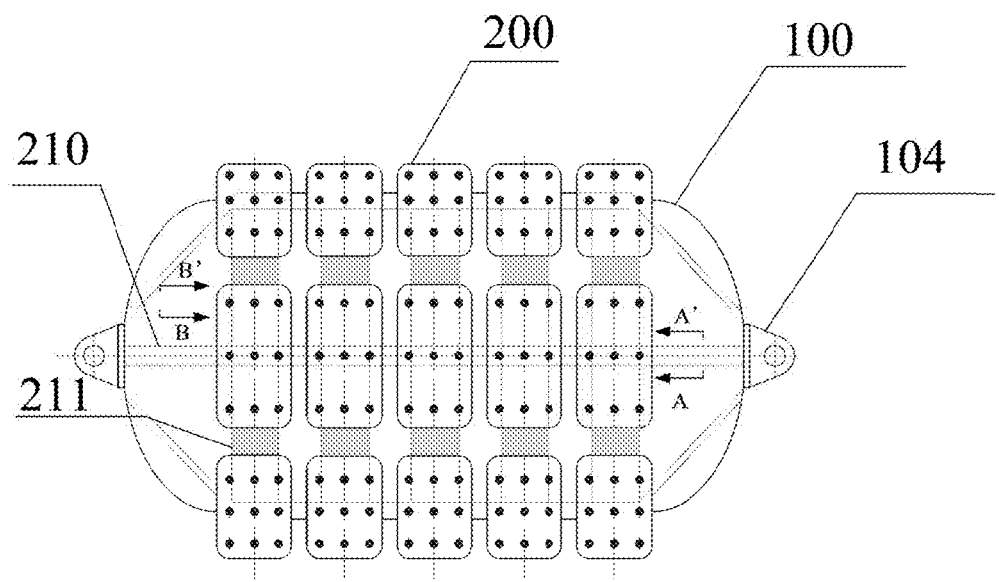
FIG. 2 is a side view of a pneumatic floating fender equipped with a plurality of UHMWPE plates as a pneumatic floating fender outer protection cover according to one embodiment.

Referring now to FIG. 2. FIG. 2 illustrates a pneumatic floating fender 100 with a plurality of UHMWPE plates 200 as an outer protection cover, longitudinal rubber bandage belts 210, and circular rubber bandage belts 211 with one towing ring 104 at each end of the fender 100. Longitudinal rubber bandage belts 210 are designed to provide the fixation foundations of these UHMWPE plates 200 with rounded and curved corners for minimization of the wearing damages between these flat and hard plates and the fender body outer curved surface. The longitudinal rubber bandage belts 210 and the circular rubber bandage belts 211 form a structural reinforcement system to the fender body 100. In addition, the longitudinal rubber bandage belts 210 are utilized to pass the friction forces at these UHMWPE plate 200 surfaces to the towing rings 104 at the fender ends.

Figures 1, 2:
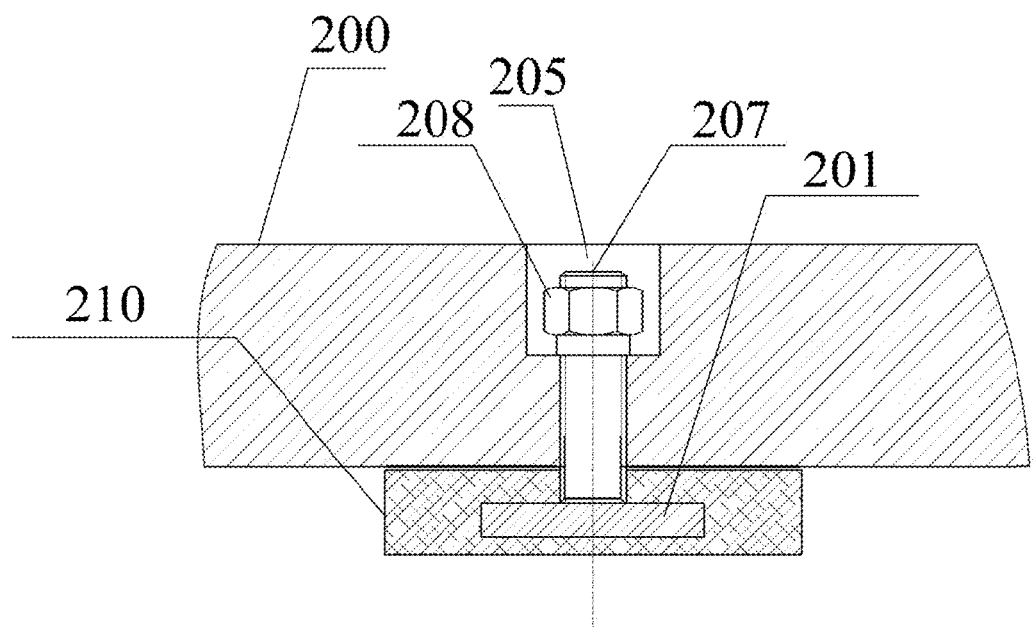
Figure 2:
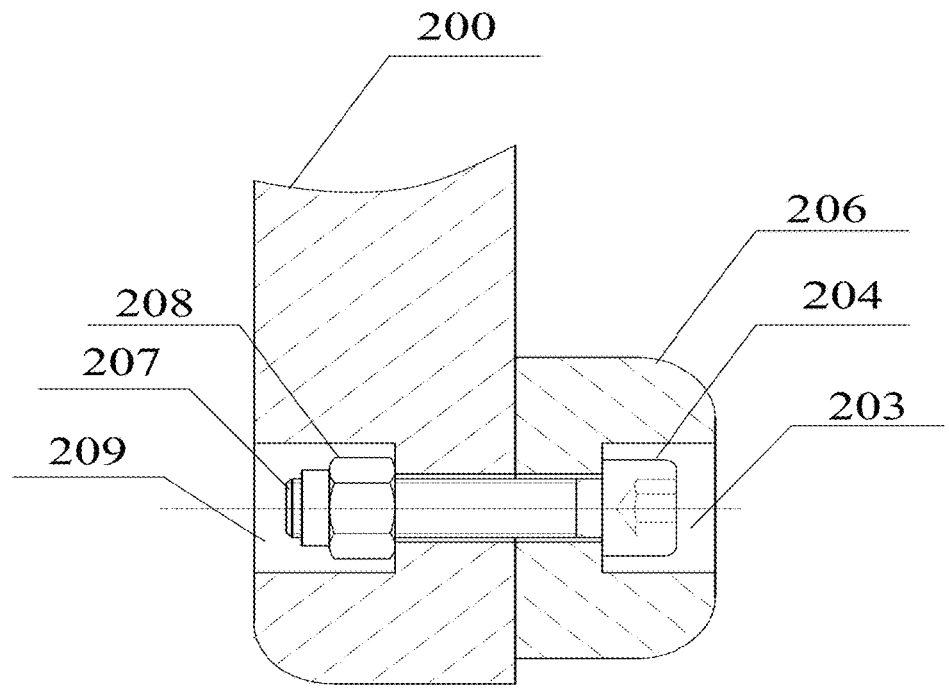

FIG. 2-1 illustrates a cut-off cross section view along A-A' line in FIG. 2 to show the details of how a UHMWPE plate 200 is fixed to an embedded steel plate 201 with a bolt 207, which has no bolt head, and a nut 208. A UHMWPE plate 200 with a circular recess 205 and a hole for the bolt 207 without bold head, which has one end welded to the embedded steel plate 201 upper surface prior to vulcanization and bonded with the longitudinal rubber bandage belt 210 through vulcanization. The other end of the bolt 207 is used for fixation with a nut 208, so as to fix the UHMWPE plate 200 to the steel plate 201 mechanically. In one embodiment, the embedded steel plate 201 could be other types of metal plates such as stainless steel plate or an aluminum plate.

FIG. 2-2 illustrates a cut-off cross section view along B-B' line in FIG. 2 to show the details of how a UHMWPE plate 200 is fixed to a UHMWPE shim plate 206 with a bolt 207 and a nut 208. A UHMWPE plate 200 with a circular recess 209 and a hole for a bolt 204 to fix the UHMWPE shim plate 206 with the bolt 204 and the nut 208 in a simple mechanical fixation. The shim plate 206 also has a circular recess 203 for the placement of the bolt 204 during the fixation. All corners and the sharp angles of the UHMWPE plate 200 and the UHMWPE shim plate 206 shall be rounded and curved up to avoid potential scratching damages to the rubber outer surface of the fender body 100 and possible scratching damages to ship outer shell paints during relative sliding and direct impacting.

Figure 3:
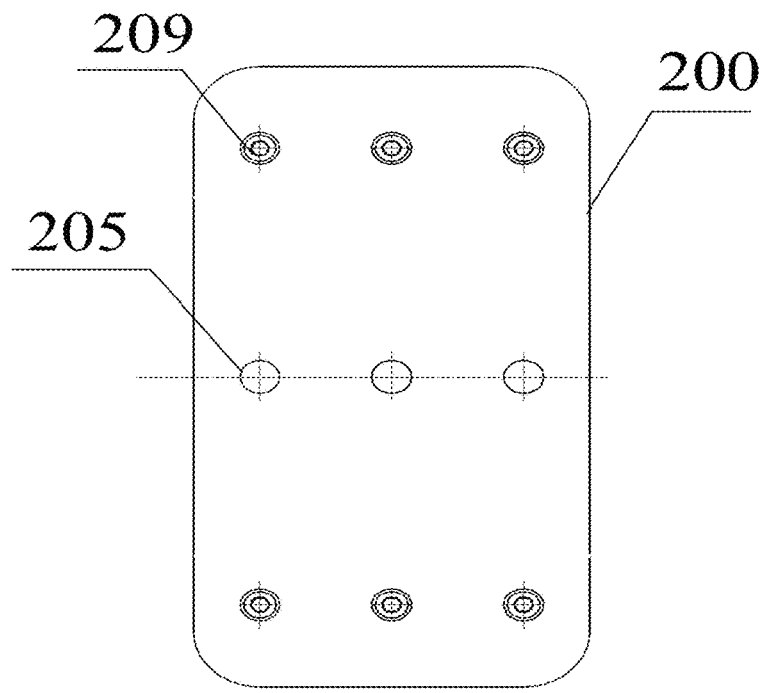
FIG. 3 is a plan view of one single UHMWPE plate with six of the recesses in two rows used for fixation to shim plates and with the other three recesses in one row used for fixation to the embedded steel plate bonded to the fender outer rubber surface.

Referring to FIG. 3, a single UHMWPE plate 200 prior to the fixation to the fender outer rubber layer is illustrated with six border recesses 209 and three middle recesses 205. Only the middle row of the three recesses 205 are reserved for fixation between the embedded plate 201 and the UHMWPE plate. The other six border recesses 209 are reserved for fixation between the UHMWPE plates 200 and the UHMWPE shim plates 206. The reason for placing the shim plates 206 at the top and the bottom borders of the plate 200 is to maximize the returning moment once the plate 200 is subjected to a bending moment. The reason for placing only one row of fixation at the middle of the UHMWPE plate 200 is to avoid the rubber shrinkage between any two rows of fixation during a vulcanization process.

In one embodiment, one UHMWPE flat plate 200 and two UHMWPE shim plates 206 can be modeled together as one single integrated unit during the fabrication of the product, prior to the fixation to the embedded plate 201. In this embodiment, no bolts and nuts are needed.

Figure 4:
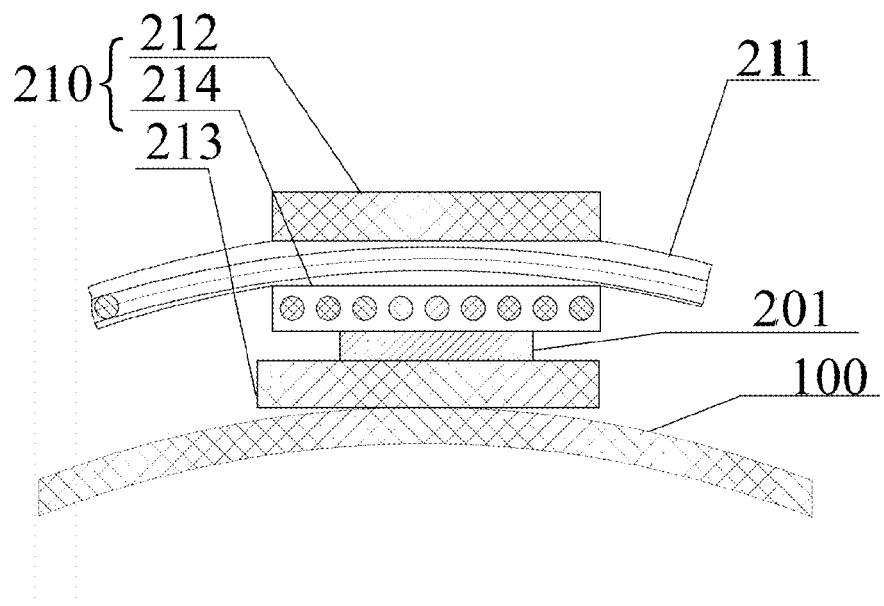
FIG. 4 is a cross section view showing the crisscross details between a longitudinal rubber bandage belt and a circular rubber bandage belt.

FIG. 4 is a cross section view to show the crisscrossing details between a longitudinal rubber bandage belt 210 and a circular rubber bandage belt 211, prior to the vulcanization process, at the crisscross point. The longitudinal rubber bandage belt 210 is composed of three layers: top rubber layer 212, the middle fiber net layer 214, and the bottom rubber layer 213 just above the fender body 100 outer rubber surface. The circular rubber bandage belt 211 is composed of at least two layers: one rubber layer and one fiber net layer. The steel plate 201 is placed just below the middle fiber net layer 214, and the circular rubber bandage belt 211 is placed above the middle fiber net layer 214. Such configuration provides a strong structural design between the middle fiber net layer 214 and the circular rubber bandage belt 211 as well as a strong bonding between the steel plate 201 and the fender body 100 outer rubber surface for the purposes of a localized structural reinforcement at each crisscross point and of transferring impact forces to the towing rings 104 at both ends of the fender body 100. Recently, Aramid fibers have been introduced to the fabrication of pneumatic floating fenders. Aramid fiber nets are used to replace conventional fiber nets such as polyester nets or Nylon nets. Aramid fibers have several unique properties superior to the conventional fibers in terms of tensional strength, anti-shear strength, anti-fatigue, and anti-corrosion, especially with the anti-shearing and anti-fatigue abilities. Although Aramid fibers are much more expensive than conventional fibers at the present time, more and more Aramid fiber nets have been utilized in pneumatic floating fender applications, especially to address the high stresses and fatigue concerns. In one embodiment of this disclosure, Aramid fiber nets could be used to replace conventional fiber nets such as the fiber nets used in the circular rubber bandage belt 211 and the fiber nets 214 used for the longitudinal rubber bandage belt 210.

Figure 5:
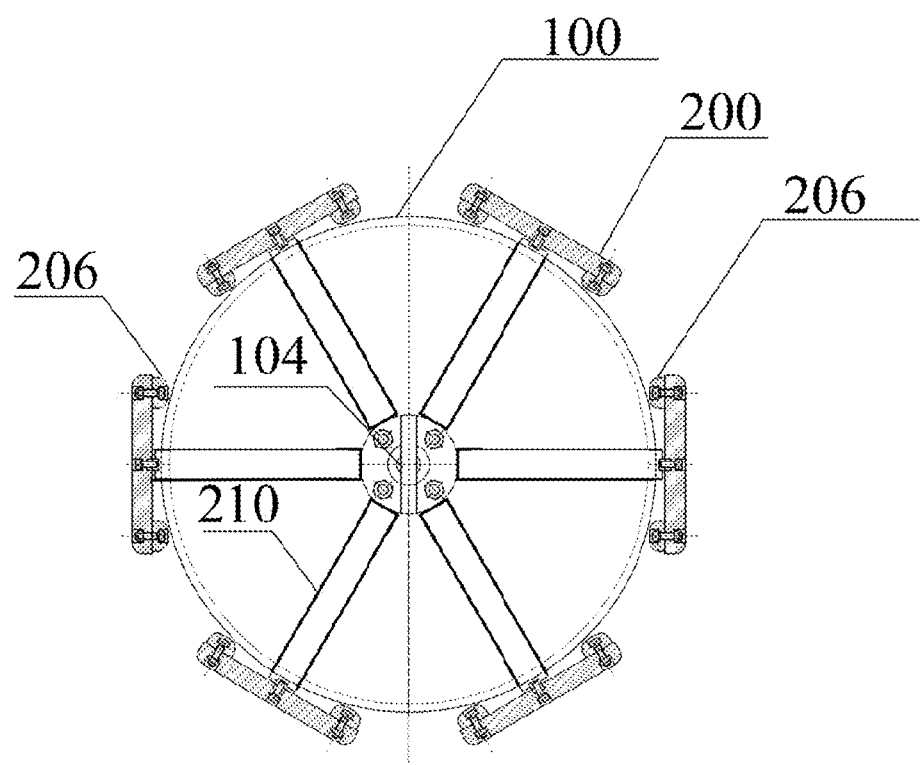
FIG. 5 is a front view of the disclosed fender with a plurality of UHMWPE plates, shim plates and longitudinal rubber bandage belts which are connected to a towing ring.

FIG. 5 is a front view of the disclosed pneumatic floating fender 100 with all installed UHMWPE plates 200, all UHMWPE shim plates 206 and six longitudinal rubber bandage belts 210 to connect all the UHMWPE plates 200 between the two towing rings 104 at the fender 100 two ends.

Figure 6A:
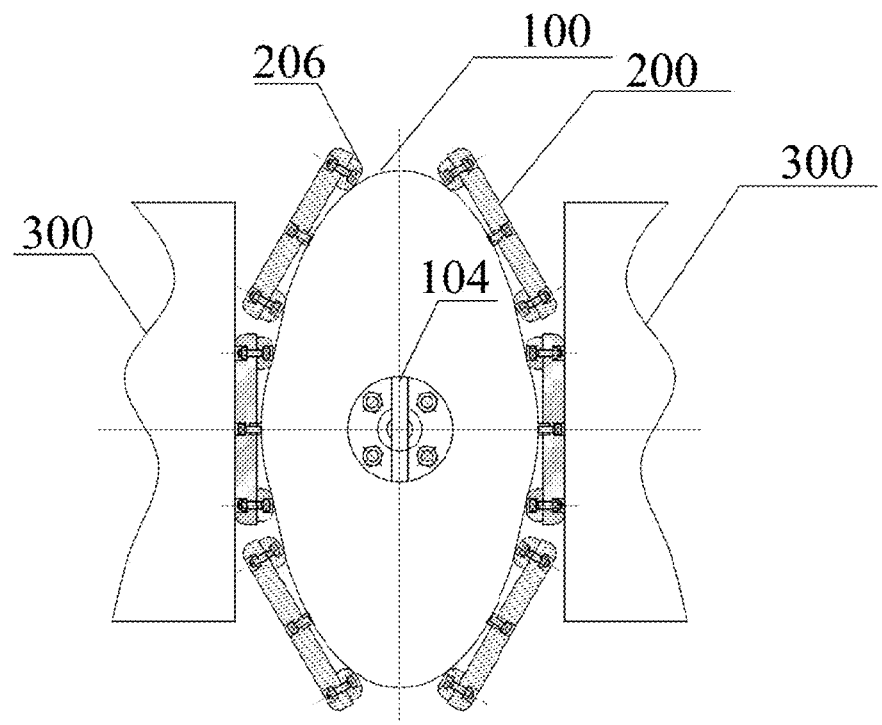
FIG. 6A is a front view of a pneumatic floating fender equipped with a plurality of UHMWPE plates as the protection cover layer which is under a squashed condition between two ships. Longitudinal rubber bandage belts and circular rubber bandage belts are omitted for the sake of clarity.
Figure 6B:
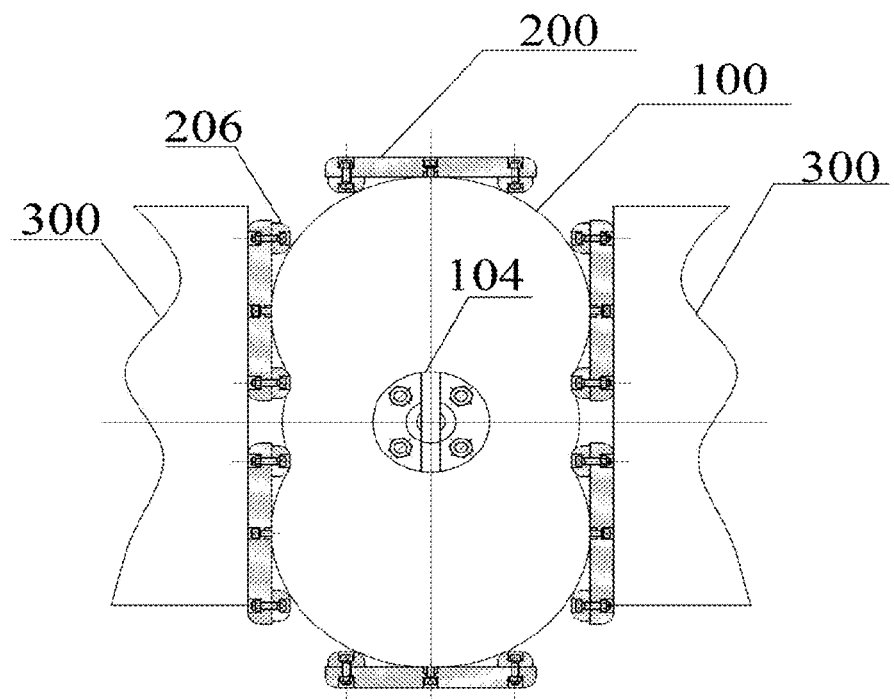
FIG. 6B is a front view of a pneumatic floating fender equipped with a plurality of UHMWPE plates as the protection cover layer which is under another squashed condition between two ships. Longitudinal rubber bandage belts and circular rubber bandage belts are omitted for clarity.

Referring now to FIGS. 6A and 6B. These two figures illustrate two possible configurations when a pneumatic floating fender 100, equipped with UHMWPE plates 200, UHMWPE shim plates 206 as the fender outer protection cover, is squashed between two ship outer shells 300. Longitudinal rubber bandage belts and circular rubber bandage belts are omitted for the sake of clarity.

Although preferred embodiments of a pneumatic floating fender with a plastic protection cover in accordance with the present invention has been described herein, those skilled in the art will recognize that various substitutions and modifications may be made to the specific features described without departing from the scope and spirit of the invention as recited in the appended claims.

What is claimed is:

1. A floating fender having a plurality of plastic plates with rounded and smooth corners and angles fixed to a surface of the floating fender body outer rubber layer to act as an outer protection cover, the floating fender comprising:
   a plurality of rubber bandage belts at the fender body outer rubber surface;
   a pair of plastic shim plates fixed near both ends of each flat plastic plate facing the rubber layer beneath to form an integrated plastic plate unit;
   a plurality of metal plates, with welded fixings at their surfaces, embedded inside rubber bandage belts prior to vulcanization, with one such plate at each crisscross point for each integrated plastic plate unit; and
   a row of simple mechanical fixings in the middle of each plastic plate unit for fixation between each embedded metal plate and the plastic plate.

2. The floating fender according to claim 1, wherein the floating fender is a pneumatic floating fender.

3. The floating fender according to claim 1, wherein the metal plates are stainless steel plates.

4. The floating fender according to claim 1, wherein the welded fixings at each metal plate upper surface are bolts with one end welded to the surface of the embedded metal plate.

5. The floating fender according to claim 1, wherein the plastic plates are made of UHMWPE (Ultra High Molecular Weight Polyethylene) material.

6. The floating fender according to claim 1, wherein the rubber bandage belts comprising:
   a) a plurality of longitudinal rubber bandage belts, each connecting to the two towing rings at both ends of the floating fender; and
   b) a plurality of circular rubber bandage belts, each crisscross connecting a plurality of longitudinal rubber bandage belts at the floating fender circular surface.

7. The floating fender according to claim 6, wherein each rubber bandage belt, either a longitudinal rubber bandage belt or a circular rubber bandage belt, comprising at least two layers: one rubber layer and one fiber net layer.

8. The floating fender according to claim 7, wherein each fiber net is made of Aramid fibers.

9. The floating fender according to claim 7, wherein the embedded metal plate is placed under the fiber net layer of a longitudinal rubber bandage belt.

10. The floating fender according to claim 7, wherein the circular rubber bandage belt is sandwiched between the top rubber layer and the fiber net layer of each longitudinal rubber bandage belt.

11. The floating fender according to claim 1, wherein each crisscross point for each embedded metal plate is a cross location between a longitudinal rubber bandage belt and a circular rubber bandage belt.

12. The floating fender according to claim 1, wherein each mechanical fixation comprising:
   a) a bolt with one end welded to an embedded metal plate upper surface;
   b) the embedded metal plate is bonded with rubber bandage belts at fender rubber surface through vulcanization; and
   c) each plastic plate unit is bolted with the embedded metal plate.

13. The floating fender according to claim 1, wherein the simple mechanical fixation between each flat plastic plate and shim plates are bolted connections.

14. The floating fender according to claim 1, wherein one piece of a flat plastic plate and two pieces of plastic shim plates are integrated with bolts and nuts to form one single piece of the integrated plastic plate unit.

15. The floating fender according to claim 1, wherein one piece of a flat plastic plate and two pieces of plastic shim plates are modeled together during fabrication to form one single piece of plastic product.

16. The floating fender according to claim 1, wherein the color of the plastic plates is orange.

17. The floating fender according to claim 1, wherein the floating fender with a body outer rubber layer is a foam filled offshore fender.

18. A method for manufacturing a floating fender having a plurality of plastic plates with rounded and smooth corners and angles fixed to a surface of the floating fender body outer rubber layer, a plurality of rubber bandage belts at the fender body outer rubber surface, and a plurality of metal plates embedded inside rubber bandage belts with one such plate at each crisscross point for each plastic plate, wherein the rubber bandage belts comprise a plurality of longitudinal rubber bandage belts connecting to the two towing rings at both ends of the floating fender and a plurality of circular rubber bandage belts crisscross connecting the plurality of longitudinal rubber bandage belts at the floating fender circular surface, each longitudinal rubber bandage belt having a top rubber layer, a middle fiber net layer and a bottom rubber layer, the method comprising:
   at each crisscross point, placing the circular rubber bandage belt sandwiched between the top rubber layer and the fiber net payer of the longitudinal rubber bandage belt before vulcanization;
   at each crisscross point, placing a metal plate under the fiber net layer of the longitudinal rubber bandage belt before vulcanization;
   vulcanizing the fender bender body with the plurality of rubber bandage belts and the plurality of metal plates;
   fixing a pair of plastic shim plates to both ends of each flat plastic plate to form an integrated plastic plate unit; and
   fixing each integrated plastic plate unit to the metal plate at each crisscross point of the rubber bandage belts.

19. The method for manufacturing a floating fender according to claim 18, wherein each plastic plate unit has a row of simple mechanic fixings in the middle for the fixation between each metal plate and the plastic plate.

20. The method for manufacturing a floating fender according to claim 18, wherein the fixation between each flat plastic plate and shim plates are bolted connections.

21. The method for manufacturing a floating fender according to claim 18, wherein one piece of a flat plastic plate and two pieces of plastic shim plates are integrated with bolts and nuts to form one single piece of the integrated plastic plate unit.

22. The method for manufacturing a floating fender according to claim 18, wherein the metal plate at each crisscross point comprises welded fixings at its upper surface.

23. The method for manufacturing a floating fender according to claim 22, wherein the welded fixings are bolts with one end welded to the surface of the metal plate.

24. The method for manufacturing a floating fender according to claim 18, wherein the metal plates are stainless steel plates.

25. The method for manufacturing a floating fender according to claim 18, wherein the plastic plates are made of UHMWPE (Ultra High Molecular Weight Polyethylene) material.

26. The method for manufacturing a floating fender according to claim 18, wherein each fiber net is made of Aramid fibers.

27. The method for manufacturing a floating fender according to claim 18, wherein the color of the plastic plates is orange.

28. The method for manufacturing a floating fender according to claim 18, wherein the floating fender with a body outer rubber layer is a foam filled offshore fender.

* * * * *